No. 736,183. PATENTED AUG. 11, 1903.
H. WESTON.
DYNAMO GEARING FOR RAILWAY VEHICLES.
APPLICATION FILED AUG. 2, 1902.
NO MODEL. 2 SHEETS—SHEET 1.

WITNESSES:
Edward Thorpe
Walton Harrison

INVENTOR
Henry Weston
BY
ATTORNEYS.

No. 736,183. Patented August 11, 1903.

UNITED STATES PATENT OFFICE.

HENRY WESTON, OF PERTH, CANADA, ASSIGNOR OF ONE-THIRD TO COLIN JAMES SEWELL, OF PERTH, CANADA.

DYNAMO-GEARING FOR RAILWAY-VEHICLES.

SPECIFICATION forming part of Letters Patent No. 736,183, dated August 11, 1903.

Application filed August 2, 1902. Serial No. 118,136. (No model.)

*To all whom it may concern:*

Be it known that I, HENRY WESTON, a citizen of the United States, and a resident of Perth, in the Province of Ontario and Dominion of Canada, have invented a new and Improved Dynamo-Gearing for Railway-Vehicles, of which the following is a full, clear, and exact description.

My invention relates to a dynamo-gearing for railway-vehicles—that is, to means for mounting a dynamo upon a railway-vehicle so as to cause the dynamo to be driven by the revolution of one of the axles of the vehicle.

Reference is to be had to the accompanying drawings, forming a part of this specification, in which similar characters of reference indicate corresponding parts in all the figures.

Figure 1:
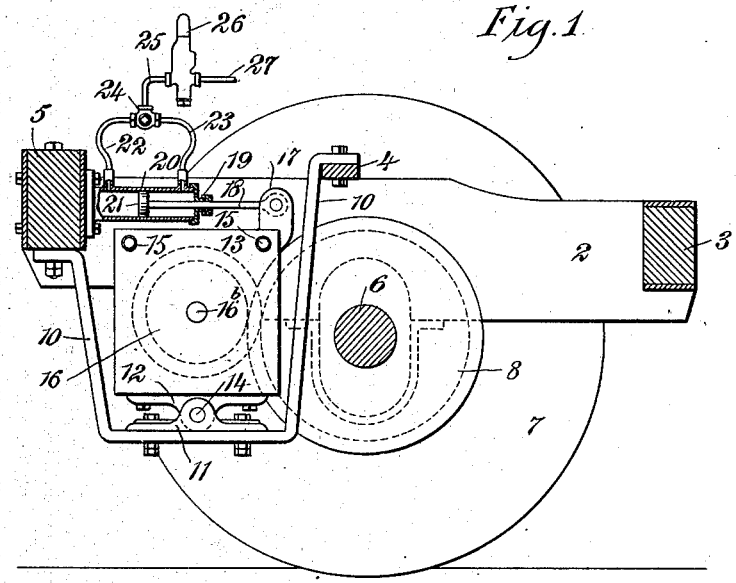
Figure 2:
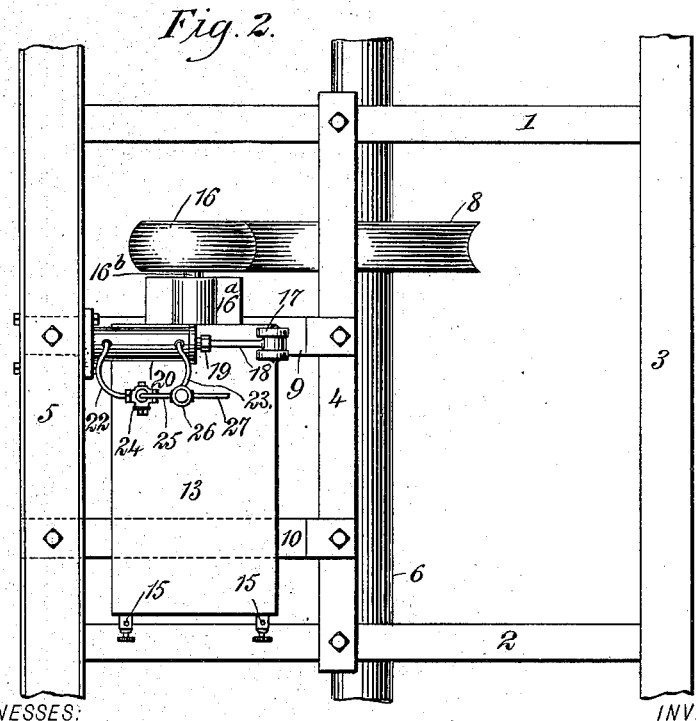
Figure 3:
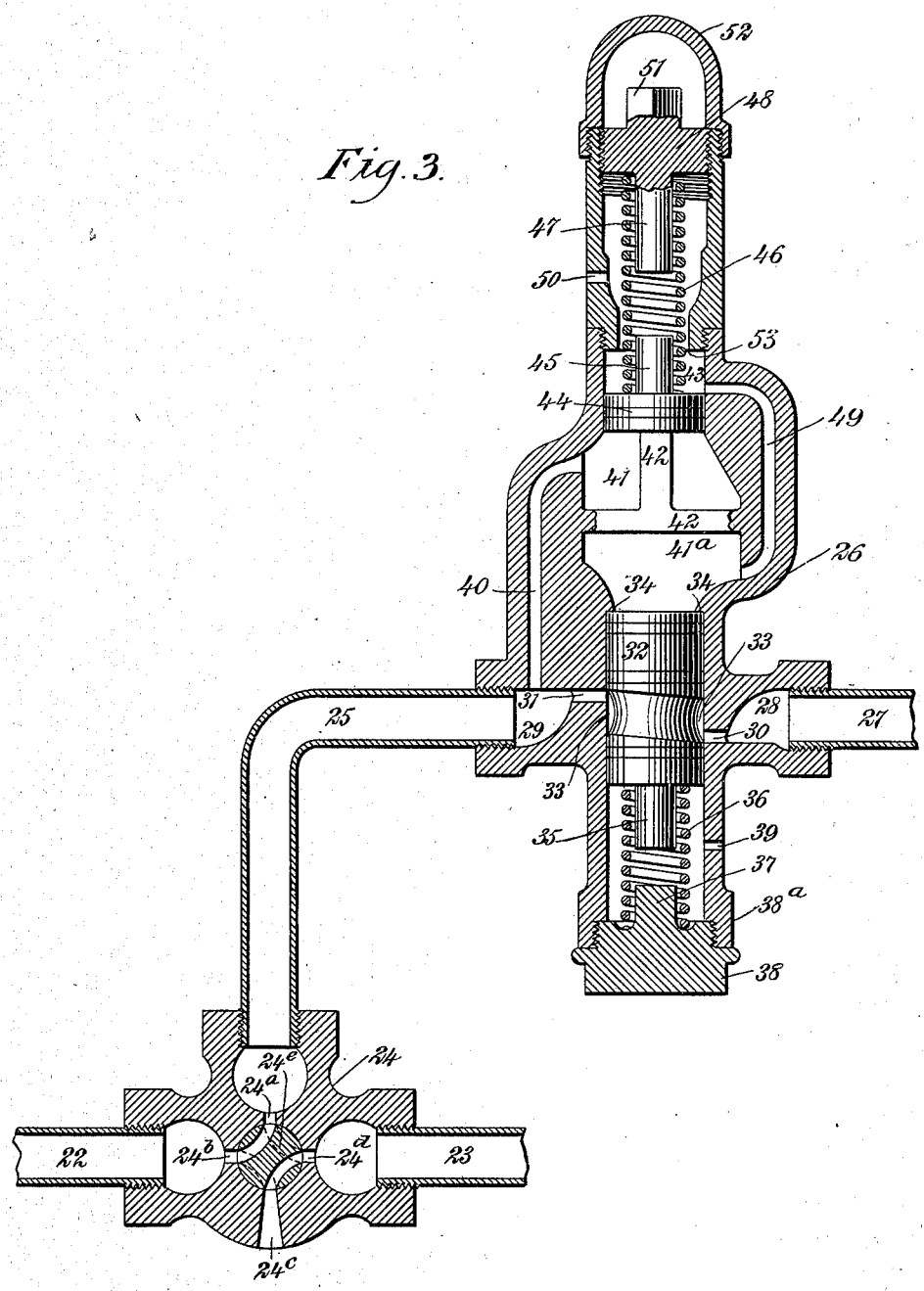

Figure 1 is a side elevation, partly in section, showing my invention as applied to a railway-car. Fig. 2 is a fragmentary plan view of the same, and Fig. 3 is an enlarged section showing the details of the pneumatic governor.

A frame consisting of side members 1 2 and cross-pieces 3 4 5 is provided for the purpose of supporting the dynamo. An axle of the vehicle is shown at 6 and a wheel at 7. Mounted rigidly upon the axle is a friction drive-wheel 8 for the purpose of actuating the dynamo.

A pair of U-shaped supports 9 10 are connected with the cross-pieces 4 5, as indicated more particularly in Fig. 1. Mounted upon the bottoms of these pieces are bearing members 11 12, provided with pivots 14. Upon the upper bearing members 12 is rigidly secured a dynamo 13, which is provided with binding-screws 15 for the purpose of supplying the current to the lamps of the car. The dynamo is preferably boxed in, as indicated in Fig. 1.

A revoluble friction-pulley 16 is mounted upon the armature-shaft $16^b$, which rests in the bearing $16^a$. The armature of the dynamo is driven by means of this pulley. A bearing 17 is mounted upon the boxing of the dynamo 13, and upon this bearing is journaled a piston-rod 18, which enters a cylinder 20 and is secured to the piston 21, as shown in Fig. 1.

A stuffing-box 19 is provided for the purpose of preventing undue leakage from the cylinder 20. Separate pipes 22 23 are connected with the respective ends of the cylinder and with the manually-operated three-way valve 24, which is of the usual construction. From the valve 24 a pipe 25 leads to the pneumatic governor 26, and from this governor a pipe 27 leads to the train-pipe. This arrangement is for the purpose of supplying air to the cylinder 20, the purpose being to force the piston 21 normally to the right, thus causing the friction-pulley 16 to engage the friction-pulley 8 and enabling the armature to be driven from the axle of the rolling-stock.

From an inspection of Fig. 1 it will be seen that the boxed dynamo 13 can be rocked upon the pivot 14, so that when pressure is applied through the pipe 22 against the piston 21 the friction-pulley 16 is forced into engagement with the pulley 8.

The three-way valve 24 is provided with the ordinary passages $24^a$, $24^b$, $24^c$, and $24^d$ and is also provided with a channeled plug $24^e$, which is made revoluble in the usual manner. The idea is that by turning the revoluble plug in either a clockwise or contra-clockwise direction, as desired, either end of the cylinder 20 may be vented. The three-way valve can also be used for continuously forcing the dynamo toward the left, so as to prevent engagement of the friction-pulleys. In other words, the train operatives by turning the plug $24^e$ of the three-way valve in the one direction or the other may render the dynamo operative or inoperative, as desired.

The pneumatic governor 26 is desirable, for the reason that the air-pressure of the train-pipe is somewhat irregular and perhaps intermittent. The pressure may sometimes run as high as one hundred and ten pounds per square inch and again may drop as low as forty pounds per square inch. As the excessive pressure would be destructive to the dynamo and its gearing, it is desirable that the air before reaching the cylinder 20 shall have its pressure automatically reduced to an extent approximating the weakest pressure of the train-pipe. The governor used for this purpose will now be described, reference being had more particularly to Fig. 3.

Adjacent to the ends of the pipes 27 and 25 are cavities 28 29, and from these cavities, respectively, the channels 30 31 lead inward toward the piston 32, which is provided with an annular channel 33. This piston normally lodges against the annular shoulder 34 and is provided with a boss 35. Circumscribing this boss is a spiral spring 36, which also engages a boss 37, mounted upon the lower cap 38. This cap by means of the screw-threads 38ª is adjustable, so as to confer any desired pressure upon the spring 36.

A vent-hole is provided at 39 below the lower end of the piston 32. A channel 40 leads from the cavity 29 to the central chamber 41, within which is a web 42, which serves as a limiting-stop for a movable piston 44, disposed within the cylindrical slideway 43. A boss 45 is rigidly connected with the piston 44 and is circumscribed by the lower end of the spiral spring 46. The upper end of this spring is engaged by a boss 47, mounted upon an adjustable screw-cap 48.

A channel 49 connects the upper portion of the slideway 43 with the chamber 41ª. A vent-hole 50 is provided above the piston 44. The screw-cap 48 is adjustable by means of the angular head 51, which is protected by means of a dust-cap 52.

The operation of the governor is as follows: Air from the train-pipe—say at a high pressure—enters the governor through the pipe 27, cavity 28, channels 30 33, thence passes through channel 31 and cavity 29 to the pipe 25, thence through the three-way valve 24 to the left-hand portion of the piston 20. Some of the channels mentioned, together with the channels in the revoluble plug 24ᵉ of the three-way valve, being quite small the pressure within the cylinder 20 is not raised abruptly, but gradually. The dynamo 13 is therefore gently moved toward the right, so that the friction-pulley 16 engages the friction-pulley 8. A small portion of the air passes from the cavity 29 through the channel 40 to the chamber 41. The lower portion of the web 42 serves as a diaphragm and prevents the air from pressing against the upper end of the piston 32. As the air-pressure accumulates in the chamber 41, however, the piston 44 is gradually raised until it finally reaches a point where the air can pass from the chamber 41 through the channel 49 to the chamber 41ª, whereupon it presses downward upon the upper end of the piston 32.

If the air-pressure in the chamber 41ª exceeds a certain predetermined limit, the piston 32 is forced downward, so that the channel 33 no longer makes connection between the channels 30 and 31. This cuts off the air-supply of the cylinder 20. As soon, however, as the air-pressure within the cylinder 20 is reduced to a slight extent the air-pressure within the chamber 41ª relaxes, whereupon the spring 36 forces the piston 32 into its normal position abutting the annular shoulder 34, as indicated in Fig. 3. It will therefore be observed that the action of the governor is entirely automatic and that the pressure within the cylinder 21 may be maintained approximately constant and much lower than the maximum pressure of the train-pipe.

The revoluble plug 24ᵉ may of course be adjusted so as to partially close the passages 24ª, 24ᵇ, 24ᶜ, and 24ᵈ, thus preventing the possibility of abrupt changes in the air-pressure within the cylinder 20, even within the predetermined limits intended for the pressure.

My invention is particularly useful for driving the dynamos used for lighting and heating passenger-cars of all kinds.

Having thus described my invention, I claim as new and desire to secure by Letters Patent—

1. A dynamo-gearing for railway-vehicles, comprising a frame, a dynamo provided with a revoluble member and actuated thereby, means for flexibly mounting said dynamo upon said frame, a revoluble member mounted upon an axle of the vehicle for engaging said revoluble member of said dynamo, pneumatic mechanism to be connected with a train-pipe for maintaining said revoluble member of said dynamo in engagement with said revoluble member upon said axle, and a manually-operated valve connected with said pneumatic mechanism for venting said pneumatic mechanism at will.

2. A dynamo-gearing for railway-vehicles, comprising a frame, a dynamo provided with a revoluble friction member whereby said dynamo is actuated, means for flexibly mounting said dynamo upon said frame, a revoluble friction member mounted upon an axle of the vehicle for engaging said revoluble member of said dynamo, means for gently pressing said dynamo into such position that said revoluble member shall form an operative connection, whereby said dynamo may be driven from said axle, and means, controllable at will, for instantly relaxing the pressure between said revoluble members.

3. A dynamo-gearing for railway-vehicles, comprising a frame, a dynamo journaled thereon and normally free to rock, the said dynamo being provided with a revoluble member and driven thereby, a revoluble member mounted upon an axle of the rolling-stock and actuated by the same, a pneumatic member for maintaining said revoluble members in engagement with each other, means for automatically regulating the pressure exerted by said pneumatic member, and manually-operated mechanism for relaxing and restoring said pressure at will.

4. A dynamo-gearing for railway-vehicles, comprising a frame, a dynamo journaled thereon and normally free to rock, said dynamo being provided with a revoluble member and driven thereby, a revoluble member mounted upon an axle of the rolling-stock and actuated by the same, a pneumatic member for maintaining said revoluble members in operative engagement with each other, a governor for automatically regulating the pressure exerted by said pneumatic member, and means controllable at will for venting said pneumatic member, thereby disconnecting said revoluble members from each other.

5. A dynamo-gearing for railway-vehicles, comprising a frame, a dynamo journaled thereon and normally free to rock, said dynamo being provided with a revoluble member and driven thereby, a revoluble member connected with an axle of the rolling-stock and actuated by the same, a cylinder provided with a piston for normally pressing said dynamo into a predetermined position, thereby maintaining said revoluble members in engagement with each other, a pneumatic governor, pipes connecting the same with said cylinder, a pipe for connecting said governor with a source of air-supply, and a manually-controlled valve for venting said cylinder at will, thereby disconnecting said revoluble members from each other.

6. A dynamo-gearing for railway-vehicles, comprising a frame, a dynamo provided with a revoluble member and actuated thereby, means for mounting said dynamo upon said frame so as normally to rock freely thereon, a revoluble member connected with an axle of the rolling-stock and driven thereby, a pneumatic member for yieldingly pressing said revoluble member of said dynamo into engagement with said revoluble member connected with said axle of said rolling-stock, means for automatically governing the pressure exerted by said pneumatic member, and a manually-operated valve for venting said pneumatic member at will.

7. A dynamo-gearing for railway-vehicles, comprising a frame, a dynamo pivotally mounted thereon, friction members connected with said dynamo and with an axle of the rolling-stock for the purpose of actuating said dynamo, a pneumatic motor for pressing said friction member into and out of engagement relatively to each other, a pipe for supplying air to said pneumatic motor, a pneumatic governor connected with said pipe and with a source of compressed air, said pneumatic governor consisting of a casing provided with pneumatic channels, a piston movably mounted within said casing for controlling the flow of air through the same, a spring for normally pressing said piston into a predetermined position, and an air-controlled piston for governing the flow of air through said channels, thereby controlling the position of said first-mentioned piston.

8. In a dynamo-gearing for railway-vehicles, the combination of a revoluble member, a dynamo movable relatively thereto, pneumatic mechanism for normally pressing said dynamo into engagement with said revoluble member, and means, controllable at will, for venting said pneumatic member, thereby stopping said dynamo independently of the motion of said revoluble member.

9. In a dynamo-gearing for railway-vehicles, the combination of a revoluble member, a dynamo movable relatively thereto, pneumatic mechanism for normally pressing said dynamo into engagement with said revoluble member, and a manually-operated valve for venting said pneumatic mechanism.

10. In a dynamo-gearing for railway-vehicles, the combination of a revoluble member, a dynamo movable relatively thereto, pneumatic mechanism for normally pressing said dynamo into engagement with said revoluble member, pipes connected with said pneumatic mechanism and filled with air at different pressures, another pipe for supplying air to said pipes, and a manually-operated valve connected with all of said pipes for the purpose of venting said pneumatic member.

11. In a dynamo-gearing for railway-vehicles, the combination of a revoluble member, a dynamo movable relatively thereto, pneumatic mechanism for normally pressing said dynamo into engagement with said revoluble member, pipes connected with said pneumatic mechanism and filled with air at different pressures, another pipe for supplying air to said pipes, and means controllable at will for venting said pneumatic member.

In testimony whereof I have signed my name to this specification in the presence of two subscribing witnesses.

HENRY WESTON.

Witnesses:
J. A. STEWART,
CHARLES M. POPE.